United States Patent [19]

Dietl

[11] Patent Number: 5,002,029

[45] Date of Patent: Mar. 26, 1991

[54] METHOD FOR CONTROLLING THE FIRING ANGLE OF AN INTERNAL-COMBUSTION ENGINE

[75] Inventor: Norbert Dietl, Regensburg, Fed. Rep. of Germany

[73] Assignee: Siemens Aktiengesellschaft, Berlin and Munich, Fed. Rep. of Germany

[21] Appl. No.: 438,872

[22] Filed: Nov. 20, 1989

[30] Foreign Application Priority Data

Dec. 2, 1988 [EP] European Pat. Off. ........ 88120180.0

[51] Int. Cl.⁵ .............................................. F02P 5/15
[52] U.S. Cl. ..................................... 123/422; 123/423
[58] Field of Search ................. 123/416, 417, 422, 423

[56] References Cited

U.S. PATENT DOCUMENTS

| | | | |
|---|---|---|---|
| 4,236,214 | 11/1980 | Sasayama | 123/417 |
| 4,259,723 | 3/1981 | Fujisawa et al. | 123/416 X |
| 4,377,996 | 3/1983 | Yamaguchi | 123/416 |
| 4,445,477 | 5/1984 | Ikeura | 123/417 |
| 4,498,438 | 2/1985 | Sato | 123/416 |
| 4,554,900 | 11/1985 | Komoda | 123/416 |
| 4,586,473 | 5/1986 | Nguyen | 123/416 |
| 4,799,469 | 1/1989 | Nagano et al. | 123/419 |
| 4,844,026 | 7/1989 | Tomisawa | 123/422 |

FOREIGN PATENT DOCUMENTS

| | | |
|---|---|---|
| 0233449A1 | 8/1987 | European Pat. Off. . |
| 0284054A2 | 9/1988 | European Pat. Off. . |
| 2801641A1 | 7/1978 | Fed. Rep. of Germany . |
| 3011058 | 9/1980 | Fed. Rep. of Germany . |
| 2531145 | 2/1984 | France . |
| 54-72326 | 9/1979 | Japan ................................ 123/416 |
| 2069603A | 8/1981 | United Kingdom ............... 123/423 |

Primary Examiner—Tony M. Argenbright
Assistant Examiner—Robert E. Mates
Attorney, Agent, or Firm—Hill, Van Santen, Steadman & Simpson

[57] ABSTRACT

Method for controlling the firing angle of an internal-combustion engine. During a special operation for example, thrust, the firing angle is controlled according to special values that are modified in comparison to normal values during a normal operation. During a transition mode between the special operation and the normal operation, the firing angle is controlled according to transition values. These transition values proceed from the last special value and are calculated on the basis of the normal values in that their difference is diminished cycle-by-cycle. By calculating the transition values on the basis of the normal values, the number of cycles until the normal values are reached is independent of the curve of the normal values. A continuous, smooth increase in torque thus results.

10 Claims, 2 Drawing Sheets

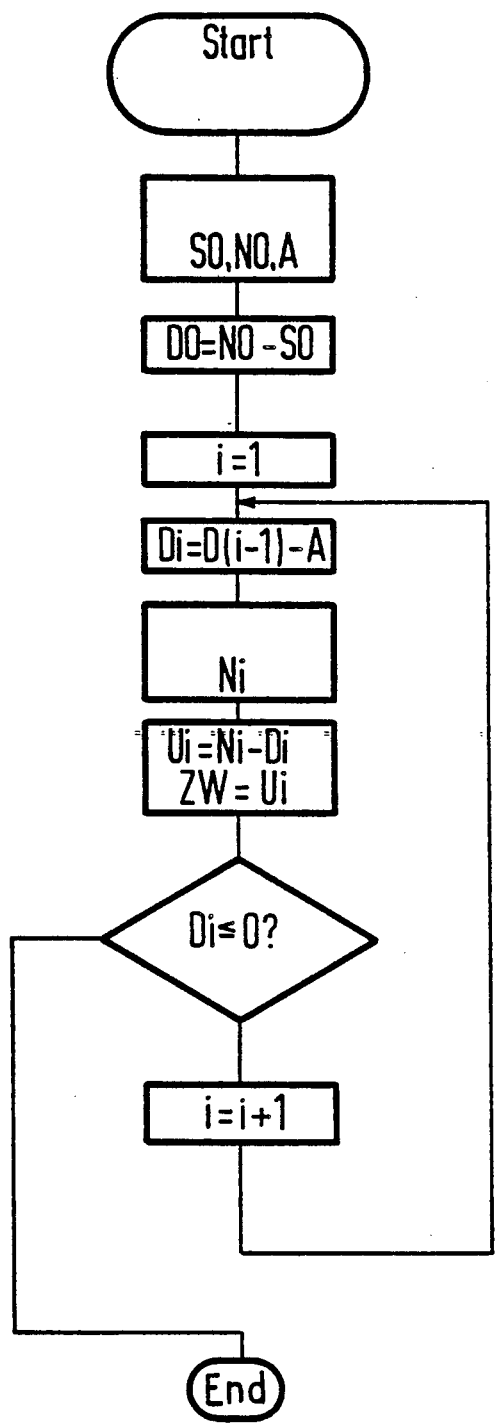

ial value
METHOD FOR CONTROLLING THE FIRING ANGLE OF AN INTERNAL-COMBUSTION ENGINE

BACKGROUND OF THE INVENTION

The present invention is directed to a method for controlling the firing angle of an internal-combustion engine and, in particular, during a transition mode between a special operation and a normal operation, whereby the firing angle is controlled cycle-by-cycle according to normal values during the normal operation as a function of speed and air quantity, according to special values during the special operation and as a function of the respective special operation, and according to transition values during a transition mode after the conclusion of the special operation.

In German Patent No. 29 17 888 a method is disclosed wherein the firing angle is retarded after the conclusion of a special mode, a thrust, and is subsequently controlled for a return to normal values for normal operation during a transition mode in accordance with transition values. These transition values are incremented cycle-by-cycle by a defined amount until the normal values are achieved. Thus a curve of these transition values is linear.

The purpose of this method is to achieve a smoother transition from thrust to normal operation. When a flat slope is selected for this linear function, then an extremely smooth transition results that, however, lasts longer. When, by contrast, a steep slope is selected, then the transition is not as smooth, but the time becomes shorter. It is difficult, however, to find a compromise between these two extremes since the normal values also follow a defined function that is very different depending on the existing operating conditions. Accordingly, an extremely rough transition in one instance and an extremely smooth transition in another instance will result for a given selected slope.

SUMMARY OF THE INVENTION

An object of the present invention is to provide the transition values such that an optimum transition to the normal values always results.

The solution of the present invention is characterized by, proceeding from the last special value, approximating the transition values to the normal values after a plurality of cycles dependent on the size of the normal values and until the normal values are reached. The transition values are calculated on the basis of the normal values, whereby the difference thereof compared to the normal values is diminished cycle-by-cycle.

In a development of the present invention in the method described above the transition values are derived from the relationship $Ui = Ni - Di$, where i is a cycle running variable (0, 1, 2 ...) that begins at that cycle where the firing angle was controlled according to the last special value, DO is an initial difference derived from the normal value which is associated with the last special value and this last special value, and $Di = (Di - 1) - A$ wherein A is a selectable constant; and wherein the transition mode is ended when Di is less than or equal to 0.

Furthermore, the cycle-by-cycle control can occur according to clock pulses dependent on the rotatory motion of the crank shaft or according to clock pulses on the basis of a timing clock of a process control computer.

The solution of the present invention takes into consideration that the transitional mode should always last the same length of time, that is from a last special value independently of the size of the normal values or, respectively, should be concluded after an identical plurality of cycles. This is achieved in that the transition values are adapted to the curve of the normal values. the difference of a normal value minus a transition value is decremented by a defined amount at every cycle. The number of cycles until this difference becomes zero is thus always the same for a defined starting difference, namely always the same independently of the size of the normal values. This number is defined by the amount by which the difference is reduced at every cycle.

Thus, with the method of the present invention the torque is continuously increased since the transition values for controlling the firing angle are related to the normal values and are independent of changes in the operating condition of the internal-combustion engine.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 3 is a flow chart for defining transition values.

DESCRIPTION OF THE PREFERRED EMBODIMENT

Figure 1:
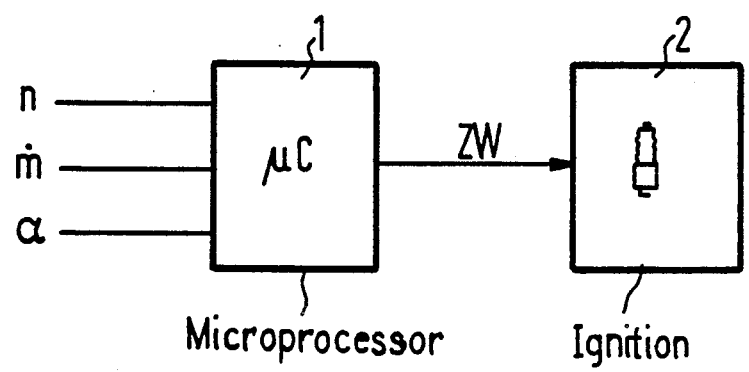
FIG. 1 is a block diagram of an apparatus for the implementation of the method of the present invention.

As shown in FIG. 1, a microprocessor 1 receives input signals that correspond to the values for speed n for an air quantity m and for a throttle control angle α of an internal-combustion engine. Therefrom, the microprocessor 1 calculates normal values N for a normal operation NB of the internal-combustion engine by which it controls a firing angle ZW. This is indicated in FIG. 1 by an interactive connection of the microprocessor 1 to an ignition means 2.

During a special operation SB of the internalcombustion engine such as, for example, for thrust or for shifting in automatic transmissions, the microcomputer 1 controls the firing angle ZW according to special values S. In the case of the thrust mode, for example, these special values S are shifted in comparison to the normal values N such that a later firing angle ZW is controlled and, thus, a desired reduction in torque results during thrust.

After conclusion of this special operation SB, the firing angle ZW is controlled according to transition values U that are selected such that the torque is again built up continuously, that is, without jerks.

Figure 2:
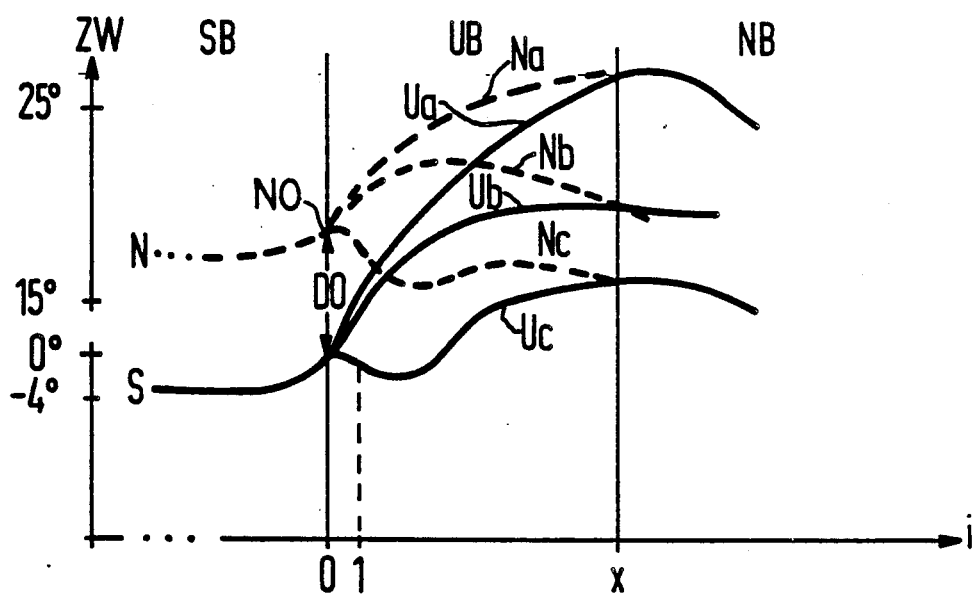
FIG. 2 is a firing angle diagram for various operating conditions.

FIG. 2 shows firing angle values in a graph with reference to the example of a thrust mode having a transitional mode and normal operation following thereupon. Cycles i are entered on the abscissa and the allocated firing angle ZW is entered on the ordinate of the graph. The cycles i are generated in synchronization with a crank shaft of the engine, for example every 120° for a six-cylinder engine. More specifically, the cycle-by-cycle control occurs according to clock pulses which are a function of the rotary motion of the crank shaft. Alternatively, the clock pulses can be based on a timing clock of a process control computer.

Proceeding from left to right in the graph, the special operation SB, thrust, is present up to the cycle referenced 0 and the transition mode UB follows, this ending with the cycle referenced x and, finally, the normal operation NB follows. The normal values N, special values S and transition values U are thereby not shown point-by-point but as a curve for greater clarity. The solid-line curves are those values according to which the firing angle ZW is controlled and the broken-line curves indicate the associated normal values N.

In accordance therewith, the firing angle ZW is controlled according to the special values S during the thrust mode. A typical range for these special values S is approximately 0° through −4° retarded ignition. By contrast thereto, the range of the normal values N is approximately 15° through 25° premature ignition. After conclusion of the thrust mode at cycle 0, the firing angle ZW now controlled according to the special values S must be controlled so that there is a return to the normal values N during the transition mode UB. To that end, the microcomputer 1 calculates an initial difference D0 from the normal value N0 and the special value S0 at cycle 0.

The following transition values U are then determined from the respective normal values N minus the initial difference D0 that is reduced by a constant A at every cycle.

The curve of the normal values N can differ greatly dependent on the operating conditions of the internal-combustion engine. Three variations, Na, Nb and Nc are therefore entered for this curve in FIG. 2. The curves respectively resulting therefrom for the transition values Ua, Ub and Uc are likewise illustrated.

The flow chart of FIG. 3 shows the exact calculation of these transition values U. After the end of the thrust mode, the program run is started and the special value S0, the normal value N0 at cycle 0 as well as the constant A are read in during the next step. This constant A, for example, can be 1° or 2°.

In the next step, the initial difference D0 is calculated from N0 and S0 and the cycle running variable i is then set equal to 1 for the calculation of the first transition value U1.

In the following step, a difference D1 is formed from the initial difference D0 and the constant A at this first program run. After the read-in of the normal value N1 for this first cycle, the transition value U1 can than be calculated in the next step from the difference between the normal value N1 and the difference D1. The firing angle ZW is then controlled according to this transition value U1.

This is then followed by the interrogation as to whether the difference D1 is less than or equal to zero. If yes, then this means that the transition value U1 just now calculated has already reached or exceeded the size of the associated normal value N1. In this case, the transition mode UB is ended and the program run is concluded. Subsequently, the firing angle ZW is controlled in the standard manner according to the normal values N, as may be seen in FIG. 2.

When, by contrast, if the difference D1 is not less than or equal to zero, then further transition values Ui must be calculated. To that end, the cycle running variable i is incremented by 1 and the steps beginning with the calculation of a new difference D2 then follow.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for controlling the firing angle of an internal-combustion engine during a transition mode between a special operation and a normal operation, whereby the firing angle is controlled cycle-by-cycle according to normal values during the normal operation dependent at least on the speed of the engine and on the air quantity of the engine, according to special values during the special operation dependent on the respective special operation and according to transition values during a transition mode after the conclusion of the special operation, comprising the step of:

proceeding from a last special value, approximating the transition values of the normal values until a normal value is reached after a plurality of cycles, by calculating the transition values on the basis of the normal values, the number of cycles until normal values are reached being independent of the size of the normal values, whereby the difference between the transition values and the normal values is dimished cycle-by-cycle.

2. The method according to claim 1, wherein the transition values are derived from the relationship $Ui = Ni - Di$, whereby:

i is a cycle running variable (0, 1, 2 ...) that begins at that cycle where the firing angle is controlled according to the last special value;

Ui is a transition value;

D0 is an initial difference derived from the last normal value of the special operation and the last special value; and $Di = D(i-1) - A$ where A is a selectable constant; and wherein the transition mode is ended when Di is less than or equal to 0.

3. The method according to claim 1, wherein the cycle-by-cycle control occurs according to clock pulses dependent on the rotatory motion of the crank shaft.

4. The method according to claim 1, wherein the cycle-by-cycle control occurs according to clock pulses on the basis of a timing clock of a process control computer.

5. A method for controlling the firing angle of an internal-combustion engine during a transition mode between a special operation and a normal operation, whereby the firing angle is controlled cycle-by-cycle according to normal values during the normal operation dependent at least on the speed of the engine and on the air quality of the engine, according to special values during the special operation dependent on the respective special operation and according to transition values during a transition mode after the conclusing of the special operation, comprising the step of:

proceeding from a last special value, approximating the transition values to the normal values until a normal value is reached after a plurality of cycles, by calculating the transition values on the basis of the normal values, the number of cycles until normal values are reached being independent of the size of the normal values, whereby the difference between the transition values and the normal values is diminished cycle-by-cycle, the transition values being derived from the relationship $Ui = Ni - Di$, whereby:

i is a cycle running variable (0, 1, 2 ...) that begins at that cycle where the firing angle is controlled according to the last special value;

Ui is a transition value;

DO is an initial difference derived from the last normal value of the special operation and the last special value; and $Di = D(i-1) - A$; where A is a selectable constant; and wherein the transition mode is ended when Di is less than or equal to 0.

6. The method according to claim 5, wherein the cycle-by-cycle control occurs according to clock pulses dependent on the rotary motion of the crank shaft.

7. The method according to claim 5, wherein the cycle-by-cycle control occurs according to clock pulses on the basis of a timing clock of a process control computer.

8. A method for controlling the firing angle of an internal-combustion engine during a transition mode between a special operation and a normal operation, comprising the steps of:

(a) providing a plurality of cycles and a corresponding cycle running variable whereby the firing angle is controlled cycle-by-cycle according to special values during the special operation and according to transition values during the transition mode;

(b) providing the special operation having a plurality of special values including at least a last special value;

(c) starting the transition mode after the occurrence of the last special value;

(d) providing the normal operation concurrently with the special operation and the transition mode;

(e) calculating a preceding difference value by subtracting the last special value from the associated last normal value;

(f) setting the cycle running variable equal to one;

(g) calculating the current difference value associated with the current setting of the cycle running variable by subtracting a predetermined constant from the preceding difference value;

(h) obtaining the current normal value associated with the current setting of the cycle running variable;

(i) calculating a current transition value for the current setting of the cycle running variable by subtracting the current difference value from the current normal value;

(j) controlling the firing angle according to the current transition value;

(k) determining if the current diference value is less than or equal to zero and, if it is, ending the transition mode and controlling the firing angle according to the normal values in the normal operation, and, if it is not, incrementing by one of the cycle running variable and returning to calculating the current difference value associated with the current setting of the cycle running variable.

9. The method according to claim 8, wherein the cycle-by-cycle control occurs according to clock pulses dependent on the rotatory motion of the crank shaft.

10. The method according to claim 8, wherein the cycle-by-cycle control occurs according to clock pulses on the basis of a timing clock of a process control computer.

* * * * *